United States Patent [19]
Cline et al.

[11] Patent Number: 5,655,001
[45] Date of Patent: *Aug. 5, 1997

[54] WIRELESS TELECOMMUNICATION SYSTEM USING PROTOCOL CONVERSION FOR SIGNALING BETWEEN BASE STATIONS AND LAND BASED SWITCHES

[75] Inventors: William Keith Cline, Naperville; James Joseph Fuentes, South Barrington, both of Ill.

[73] Assignee: Lucent Technologies Inc., Murray Hill, Del.

[*] Notice: The term of this patent shall not extend beyond the expiration date of Pat. No. 5,440,613.

[21] Appl. No.: 317,304

[22] Filed: Oct. 3, 1994

Related U.S. Application Data

[63] Continuation of Ser. No. 951,064, Sep. 25, 1992, abandoned.

[51] Int. Cl.$^6$ ................................................ H04Q 7/38
[52] U.S. Cl. ........................ 370/328; 379/299; 370/467; 370/385; 455/422
[58] Field of Search ................. 370/60, 94.1, 95.3; 379/58, 59, 63, 67, 89, 201, 269; 455/33.1

[56] References Cited

U.S. PATENT DOCUMENTS

| | | | |
|---|---|---|---|
| 3,626,112 | 12/1971 | Henquet | 379/58 |
| 3,627,932 | 12/1971 | Garrett | 379/299 |
| 4,242,538 | 12/1980 | Ito et al. | 179/2 EB |
| 4,256,926 | 3/1981 | Pitroda et al. | 379/58 |
| 4,599,490 | 7/1986 | Cornell et al. | 179/2 EB |
| 4,675,863 | 6/1987 | Pareth et al. | 370/50 |
| 4,777,633 | 10/1988 | Fletcher et al. | 370/50 |
| 4,817,089 | 3/1989 | Pareth et al. | 370/95 |
| 4,827,499 | 5/1989 | Wart et al. | 379/58 |
| 4,878,240 | 10/1989 | Lin et al. | 379/67 |
| 4,970,723 | 11/1990 | Lin | 370/110.1 |
| 5,081,641 | 1/1992 | Kotzin et al. | 375/1 |
| 5,249,181 | 9/1993 | Wang et al. | 370/60 |
| 5,278,890 | 1/1994 | Beeson, Jr. et al. | 379/57 |

OTHER PUBLICATIONS

Ballard, et al "Cellular Mobile Radio as an Intelligent Network Application" Electrical Communication, vol. 63#Apr. 1989.

Eizenhofer, et al, "Validation of the GSM Radio Interface Signalling Protocols–Selected Studies" Jul. 1991, IEEE.

Harland, et al, "Network Aspects of Public Land Mobile and Personal Communications Systems", 9–11, Dec. 1991 IEEE.

Duplessis and Maillard, "Pan–European Digital Cellular System for Mobile Telephones", Commutation and Transmission #2 1986.

V. Breton et al, "Tangara: digital cordless telephone system", *Commutation Et Transmission*, vol. 13, No. 3, 1991, Paris, pp. 23–32.

Ultraphone 100, *Wireless Digital Loop Carrier*™, System Description, International Mobile Machines Corporation, 1987, pp. 1.1–5.3.

*Primary Examiner*—Curtis Kuntz
*Assistant Examiner*—William Cumming
*Attorney, Agent, or Firm*—D. J. Williamson; D. L. Hurewitz

[57] ABSTRACT

A method and apparatus for offering wireless telecommunication service. A switch such as an automatic Private Branch Exchange (PBX), equipped to communicate with Integrated Services Digital Network (ISDN) stations sends ISDN signaling messages to and receives ISDN signaling messages from a protocol converter. The protocol converter, which also communicates with a wireless cell site, converts messages between the ISDN protocol and a protocol for communicating with the wireless cell site. The cell site sets up wireless connections to a mobile station, essentially in its prior art mode, and the PBX sets up connections to the cell site essentially in its prior art ISDN station control mode. The PBX is connected to a class 5 (central office) telecommunications switching system for establishing connections between the public switched telephone network and the PBX, or between outlets of the PBX for a call between wireless stations.

10 Claims, 3 Drawing Sheets

WIRELESS TELECOMMUNICATION SYSTEM USING PROTOCOL CONVERSION FOR SIGNALING BETWEEN BASE STATIONS AND LAND BASED SWITCHES

This application is a continuation of application Ser. No. 07/951,064, filed on Sep. 25, 1992, now abandoned.

CROSS-REFERENCE TO RELATED APPLICATION

This application relates to an application by James J. Fuentes entitled "Architecture For A Wireless Telecommunication System" filed Aug. 11, 1992, Ser. No. 928,386, and assigned to the same assignee as this application.

TECHNICAL FIELD

This invention relates to wireless telecommunication systems and, more specifically, to architecture for small growable wireless telecommunication networks.

PROBLEM

Wireless telecommunication networks have grown very rapidly in the past decade as a result of substantial breakthroughs in the cost of wireless telecommunication terminals, otherwise known as mobile stations. Such mobile stations exist in many forms: from those which are mounted in automobiles, to portable stations, to hand held stations. The cellular principle has permitted a large growth in the amount of wireless telecommunications which can be carried over the allocated radio spectrum thus allowing a large increase in the number of wireless telecommunication subscribers.

While major cost breakthroughs have taken place in the customer equipment (the radio transceivers for communicating with the cellular systems), a similar cost breakthrough has not taken place in the central office equipment required to establish connections between customer stations, using well-established central office administration and billing procedures. In particular, while reduced cost large systems have been designed, small and inexpensive but growable wireless switching systems are not available in the prior art.

SOLUTION

The above problem is solved and an advance is made over the prior art in accordance with this invention wherein a moderate size switching system, such as a midsize private branch exchange (PBX) is used as a mobile telecommunication control switch; in a departure from the prior art, this system is adapted for use in the cellular application by virtue of an architecture which allows the PBX to communicate with the cell sites of the cellular system as if these cell sites were other PBXs. Communications between the PBX and the cell site are accomplished via a system using an out-of-band telephone station control (OTSC) protocol, such as that used in integrated services digital network (ISDN) communication links, wherein the OTSC signal communicates with a protocol converter to convert between OTSC and cell site protocols. The PBX is then connected to a central office (class 5) switching system in such a way that the individual channels of the cell sites are transmitted as individual channels to the central office, and are switched in the central office to be connected to each other, to land based telephones served by the central office, or to trunks from the central office to a public switched telephone network.

In one embodiment, the cell sites, which are existing prior art cell sites, receive data communications from a protocol converter inserted in the dam link part of the ISDN connection; the protocol converter converts signals received from the PBX from ISDN protocol to a protocol accepted by the cell site, and converts data messages (designed for use with a mobile switch) received from the cell site from the cell site protocol to an ISDN protocol. Any other OTSC protocol for controlling telephones could be used instead of the ISDN protocol. Advantageously, such an arrangement permits the PBX to set up cellular connections in the same way that the PBX is already equipped to set up ISDN connections.

In one specific embodiment of the invention, a primary rate interface carrying a plurality of B-channels and one D-channel is used to connect the PBX with a cell site; the protocol converter in this case converts messages on the D-channel. A plurality of primary rate interfaces may share a single D-channel on one of these interfaces in an arrangement known as non-facilities associated signaling (NFAS). Advantageously, the protocol converter need only communicate with a small number of data channels. Advantageously, the development effort necessary to implement this invention is straightforward because existing PBXs, cell sites, and ISDN and cell site protocols are used.

The PBX is connected to a class 5 switching office (central office), such as AT&T's 5ESS® switch, in order to perform interconnection and billing as well as complex call functions such as voice mail, and to access the public switched telephone network for accessing mobile or land-based telephone stations not served by the central office. The class 5 switching office is connectable to a plurality of PBXs in order to interconnect mobile stations connected to these PBXs, to each other, and to the public switched telephone network. Alternatively, the PBX may be connected to a very simple class 5 switching system, such as a step-by-step system, which still performs interconnection and billing functions.

Growth for such a system is straightforward. First, the capacity of the cell site is increased to its maximum. Then, additional cell sites are added under the control of one PBX. Then, another PBX may be added, along with its cell sites. Finally, an Autoplex® 1000 system such as that described in U.S. Pat. No. 4,827,499 can be formed by adding a control processing complex to control the PBXs and the cell sites, or the PBXs may be replaced by a mobile communications telecommunication switch which can communicate directly with the cell sites without using a protocol converter.

DETAILED DESCRIPTION

Figure 1:
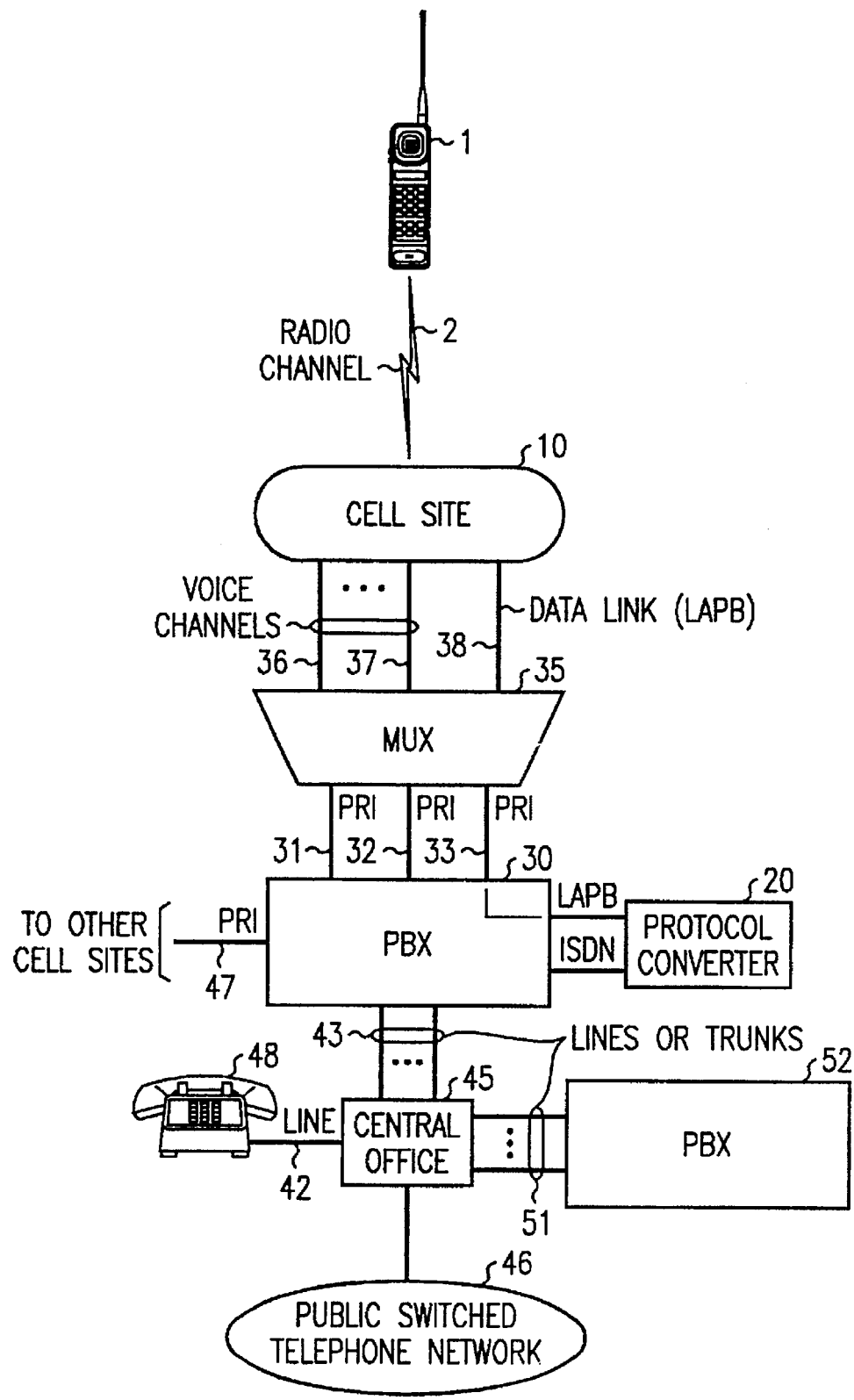
FIG. 1 is a block diagram illustrating the operation of the invention.

FIG. 1 is a block diagram illustrating the operation of applicant's invention. A radio cell site 10 communicates via radio channel 2 with a mobile station 1. A cell site such as the Autoplex® Series I Mod II Cell Site can be used in this application. A different cell site can be used if the European Global Systems for Mobile Communications (GSM) standard protocol is required, or a more advanced, e.g., Series II cell site, can be used. The cell site is connected by a multiplexer 35 to one or more primary rate interface integrated services digital network (PRI-ISDN) communication channels 31, 32, 33 to a private branch exchange (PBX) 30. The ISDN protocol is the selected out-of-band telephone station control (OTSC) protocol for the preferred embodiment. PBX 30 is connected to protocol converter 20, which functionally converts between ISDN protocol signals for the D-channel of a PRI used by PBX 30, and signals in the protocol of the cell site, transported by LAPB, for communicating with the cell site 10. The multiplexer 35 strips the cell control channel from the PRI signals and sends these cell site control channel signals via data link 38 to cell site 10. As one example, a multiplexer such as the Crossnet 442 multiplexer manufactured by Tellabs can be used. A NCR 3330 486 based computer manufactured by NCR Inc. can be used as the protocol converter (PC); the NCR computer must be equipped with an interface board such as an AT&T UNIPRISM PRI Board to terminate a PRI connection to the PC. Cell site 10 receives its control signals over the dam link 38 and transmits its responses and its own initiated data messages over that link. The protocol converter converts between ISDN control messages specified in the CCITT Q.931 call control message set and the message set required to interface with a cell site. This message set may be proprietary or it may conform with a standard such as that specified in the European GSM standard for wireless communications.

PBX 30 expects to receive only either D-channel or B-channel signals on its PRI. In order to receive a control channel in the cell site protocol, it receives such signals on an incoming B-channel, and transmits that B-channel to the protocol converter 20. The protocol converter converts the messages received on that B-channel into ISDN protocol D-channel signals and transmits these signals to the PBX for controlling the PBX. The MUX 35 multiplexes the B-channel carrying cell site control signals from the data link 38 into the PRI 33 data stream. The equivalent operation is also performed when the PBX sends D-channel signals to the protocol converter for conversion to cell site control signals for transmission to the cell site.

PBX 30 is also connected by one or more PRI facilities, such as 47, to one or more other cell sites; and by facilities such as lines or minks 43 to a class 5 central office 45. The central office 45 is for connection to a public switched telephone network 46 for accessing of telephones and mobile stations outside the region served by central office 45. Central office 45 is also connected by lines and trunks 51 to PBX 52 for serving additional cell sites (not shown), and to a plurality of land based telephones such as station 48 connected via line 42. The connection 43 to the class 5 central office can be over line facilities, one or more PRI facilities, or even digital carrier trunk facilities; a line interface is the most natural for communicating between a PBX and a central office, especially an older central office, and simplifies the process of billing at the central office. In some embodiments, central office 45 is a program controlled switching system such as the 1AESS™ system manufactured by AT&T, and in the preferred embodiment, a program controlled digital switching system such as the 5ESS® switch. Both types of systems are well known in the prior art. The switching system can also be a much older system such as a step-by-step system since applicants' arrangement requires minimal functionality of the central office switch 45. All of these central office switching systems include billing arrangements of types well known in the prior art. In one specific preferred embodiment, the PBX has a line interface for each wireless station, and connects each such station to the corresponding line interface when a connection is established. This automatically identifies the wireless station to the central office 45 at the other end of the line interface.

In the preferred embodiment, the PBX is a System 75 DEFINITY® PBX, manufactured by AT&T. A requirement for this embodiment is that the PBX be able to communicate with ISDN stations using PRI signals.

The PBX keeps track of the busy-idle state of all mobile stations currently associated with a cell site. When a mobile disconnect is detected, the cell site transmits a release message via data link 38. The PC converts this release message to an ISDN disconnect message which makes the B-channel, and its associated radio channel, available, and changes the busy-idle state of the mobile station to idle.

Figure 2:
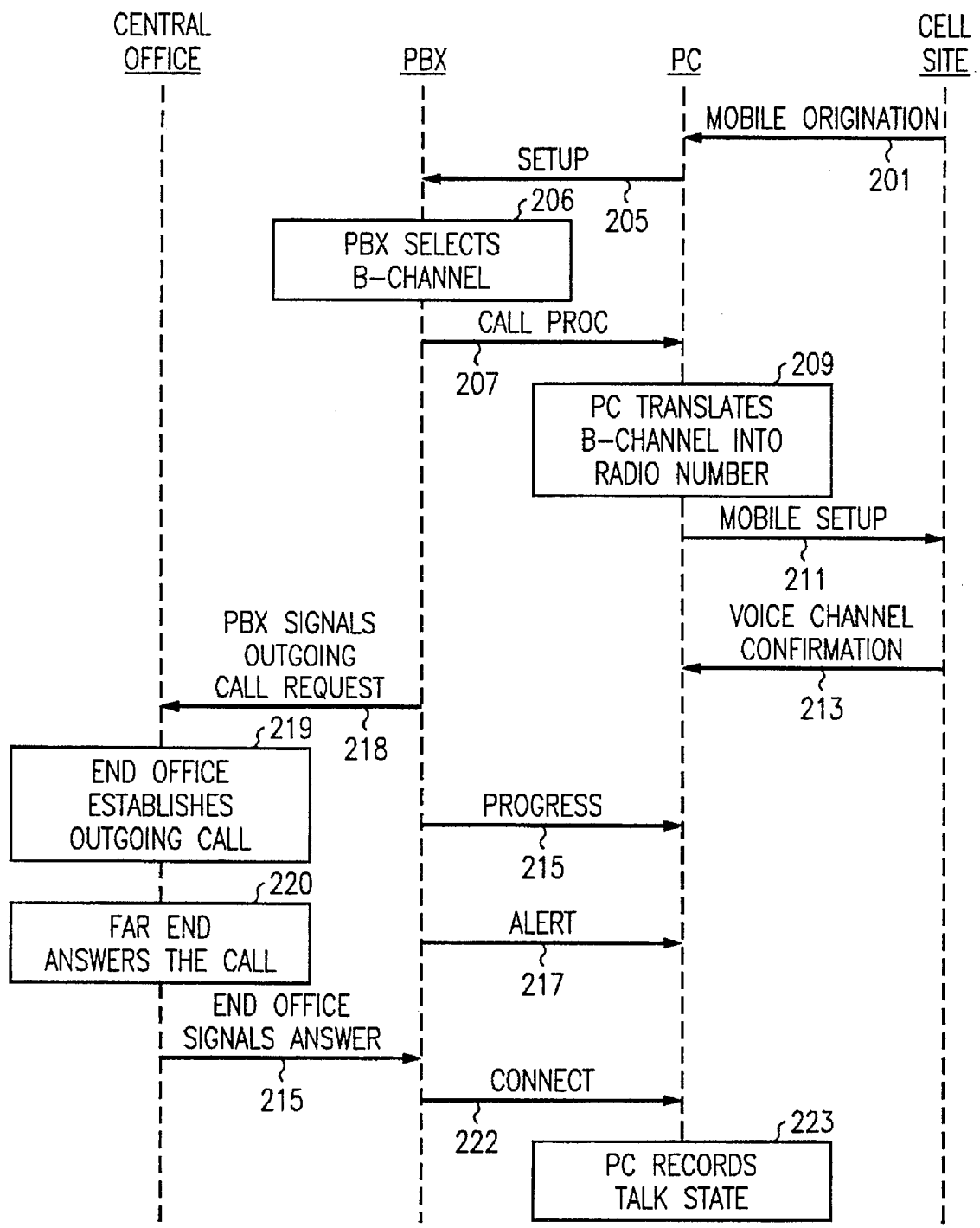
FIGS. 2 and 3 are flow and message diagrams illustrating the steps of establishing an incoming and an outgoing call.

FIG. 2 illustrates the messages and the actions performed by the protocol converter 20 in setting up a wireless originated call. The cell site 10 receives an indication from the mobile station 1 that the mobile station wishes to originate a call and receives the number of the called customer dialed by the originating mobile station. Cell site 10 sends message 201 to PC 20, the message containing an identification of the calling main station, the called number, and an indication of which directional antenna is optimum for use on this call. The mobile station picks the set-up channel that corresponds to the presently assigned directional antenna. The PC then transmits a set-up message 205, including the called directory number and an identity of the caller, to PBX 30. The PBX associates the originating mobile station number with the group of PRIs serving the assigned antenna face. As shown in action box 206 PBX 30 then selects a B-channel appropriate for use with the identified directional antenna and transmits over D-channel of PRI 33 a call proceed message 207 identifying the selected B-channel. In action block 209, PC 20 translates the B-channel identity into a radio number and transmits a mobile set-up message 211 to the cell site to establish communication between the selected B-channel and the mobile station 1. The cell site 10 having confirmed the establishment of such a radio communication then returns to the protocol converter 20 a voice channel confirmation message 213.

In the meantime, PBX 30 has requested an outgoing connection (signal 218) including the called telephone number. The central office 45 establishes the outgoing call (action block 219), which action may actually be the initiation of an incoming call as described in FIG. 3 if the call is between two mobile stations served from the central office. The PBX transmits a series of call progress messages 215 to PC 20 which maintains track of the status of the connection. When the connection has been established, an alert message 217 is sent from PBX 30 to PC 20 indicating that the called customer is being alerted. The calling customer hears audible tone. When the far end answers the call and this answer is detected in the central office (action block 220), the central office signals an answer (signal 221) to the PBX. The PBX 30 then transmits a connect message 222 to the PC 20. In response, the PC 20 records that the connection is now in the talk state (action block 223).

Figure 3:
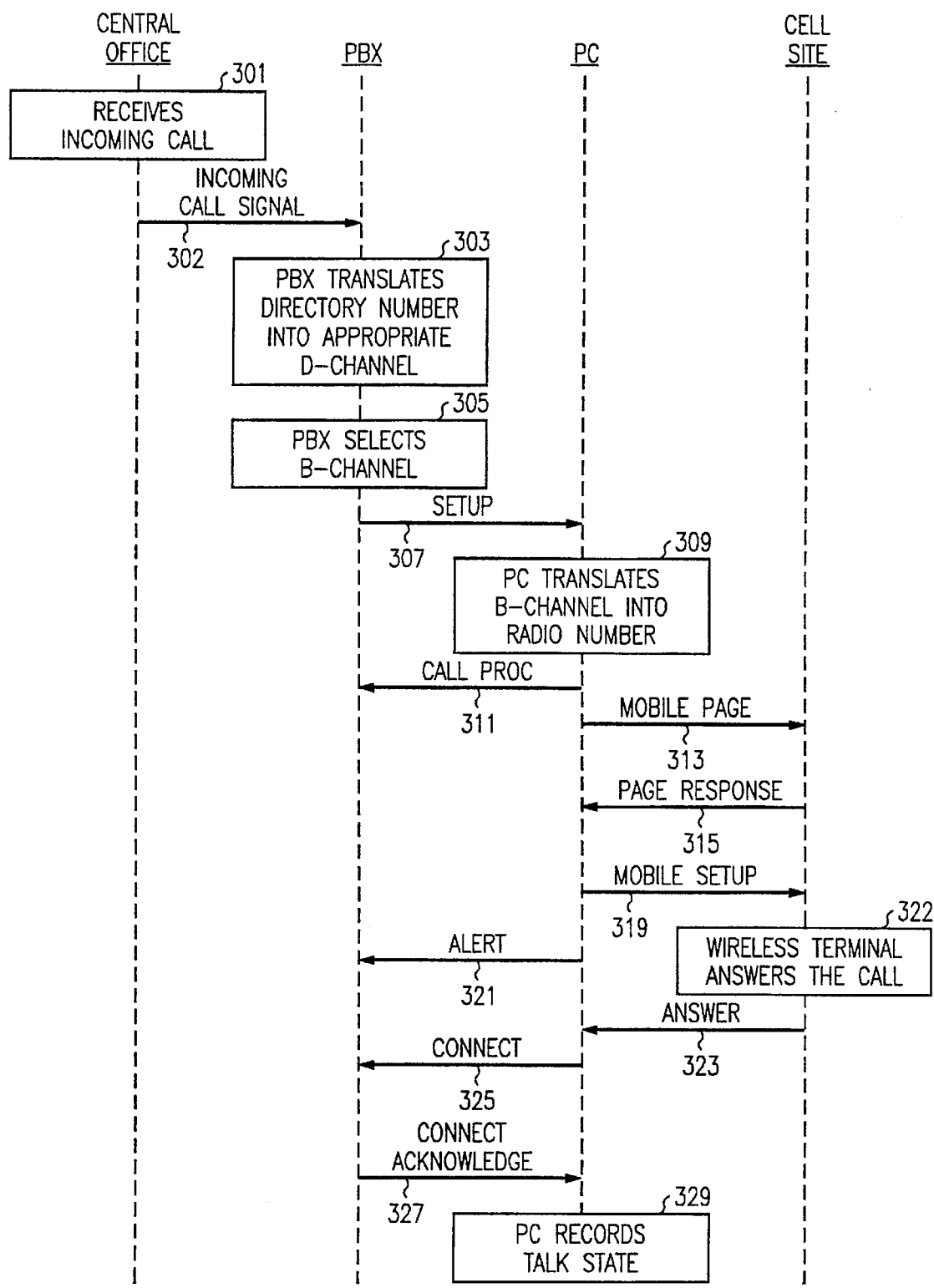

FIG. 3 illustrates a wireless terminated call. Action block 301 indicates that the central office has received an incoming or an originating call. The central office signals to the PBX that the incoming call has been received and transmits the directory number for the terminating station (signal 302). The PBX translates the directory number into the appropriate D-channel for use in communicating with the protocol converter (action block 303). The PBX then selects a B-channel to be used for this conversation (action block 305). In this embodiment, each PRI can serve the radio transceivers of only one cell site sector, but several PRIs may serve one sector. The PBX then sends a set-up message including the identity of the called main station and the identity of the B-channel to be used for the connection (message 307). The PC 20 translates this B-channel number into a radio number (action block 309) and transits, in response, a call process proceeding message 311 back to the PBX. The PC 20 then transmits a request to page the mobile station via message 313 transmitted over data link 38 to cell site 10. Cell site 10 pages the mobile and if the mobile responds properly, transmits a page response message 315 back to PC 20. The PC then sends a mobile set-up message 319 to the cell site requesting that the connection between the selected B-channel and the mobile station be established and that that connection be monitored to determine whether the called mobile station answers the call. The PC also sends an alert message back to the PBX to indicate that the calling party should receive audible ringing tone. When the wireless terminal answers the call (action block 322) an answer message 323 is sent from the cell site to the PC. The PC passes on a connect message 325 to request that the PBX complete the connection to the called customer and remove the audible ringing tone connection. After completing this task, the PBX returns a connect acknowledge message 327 to the PC and the PC records the talking state for that connection (action block 329).

The central office can be connected to the PBX using any of the standard central office PBX transmission and signaling facilities. The use of a common channel signaling arrangement between the PBX and the central office enhances the flexibility of the system.

Growth for such a system is straightforward. As the capacity of the cell site is increased to its maximum, additional cell sites are added under the control of one PBX. Then, another PBX may be added, along with its cell sites. Finally, an Autoplex 1000 system such as that described in U.S. Pat. No. 4,827,499 can be formed by adding a control processing complex to control the PBXs and the cell sites, or the PBXs may be replaced by a mobile communications telecommunication switch which can communicate directly with the cell sites without using a protocol converter.

This particular embodiment has illustrated ISDN protocol and an ISDN PRI interface to the PBX. The advantage is that the PBX can then interface with the cell site via the PC as if the cell site were connected by ISDN connections to the PBX. Any other arrangement which allows an out of band telephone station control (OTSC) signaling protocol to be used for controlling telephone stations terminated on a PBX would also meet this requirement.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A wireless telecommunication system, comprising:

a central office for connection to a public switched telephone network, said central office for communicating with land based stations and land based switching systems;

a telecommunication switch, said switch for communicating with land based stations and land based switching systems;

a wireless cell site; and protocol conversion means for converting between a cell site control protocol, said cell site control protocol for signaling to and receiving signals from a wireless cell site, and an out-of-band telephone station control (OTSC) protocol;

said telecommunication switch connected to said cell site by a plurality of unswitched first communication links;

said telecommunication switch and said cell site being connected by data link means to said protocol conversion means;

said central office connected to said telecommunication switch by a plurality of second communication links;

said central office for establishing connections among ones of said second communication links and for establishing connections between ones of said second communication links and said public switched telephone network;

wherein said telecommunication switch sends OTSC protocol signaling messages, said OTSC signaling protocol messages used for communicating between land based telephone stations and land based switching systems, to said protocol conversion means as if it were communicating directly with a land based telephone station, and said protocol conversion means converts said OTSC protocol signaling messages to cell site control protocol signaling messages for transmission to said cell site, for controlling said cell site;

wherein said cell site sends cell site control protocol signaling messages, said cell site control protocol signaling messages used for communicating with a mobile switching center, to said protocol conversion means as if it were communicating directly with a mobile telephone switching center for communicating with cell sites, and said protocol conversion means converts said cell site control protocol signaling messages to OTSC protocol signaling messages for transmission to said telecommunication switch.

2. The system of claim 1 wherein ones of said plurality of second links are terminated on ones of a plurality of line interfaces at said central office.

3. The method of the system of claim 1 wherein said telecommunication switch is a private branch exchange (PBX).

4. The system of claim 3 wherein said plurality of second communication links comprises a plurality of PBX trunks.

5. The system of claim 1 wherein said OTSC protocol is an integrated services digital network (ISDN) protocol.

6. The system of claim 1 wherein said central office is a program controlled switching system.

7. The system of claim 6 wherein said central office is a digital switching system.

8. The system of claim 1 wherein said central office is a step-by-step switching system.

9. The system of claim 1 wherein said central office is further connected to a plurality of/and-based telephone lines.

10. The system of claim 1 wherein said central office performs billing recording.

* * * * *